(No Model.)

E. Z. COLLINGS.
Underground Electric Conductor.

No. 243,215. Patented June 21, 1881.

Witnesses:
A. P. Grant
H. F. Kircher

Inventor:
Edward Z. Collings,
by John A. Wiedersheim
ATTORNEY.

N. PETERS, Photo-Lithographer, Washington, D. C.

UNITED STATES PATENT OFFICE.

EDWARD Z. COLLINGS, OF CAMDEN, NEW JERSEY.

UNDERGROUND ELECTRIC CONDUCTOR.

SPECIFICATION forming part of Letters Patent No. 243,215, dated June 21, 1881.

Application filed March 30, 1881. (No model.)

*To all whom it may concern:*

Be it known that I, EDWARD Z. COLLINGS, a citizen of the United States, residing at Camden, in the county of Camden, State of New Jersey, have invented a new and useful Improvement in Underground Electric Conductors, which improvement is fully set forth in the following specification and accompanying drawings, in which—

Figure 1:
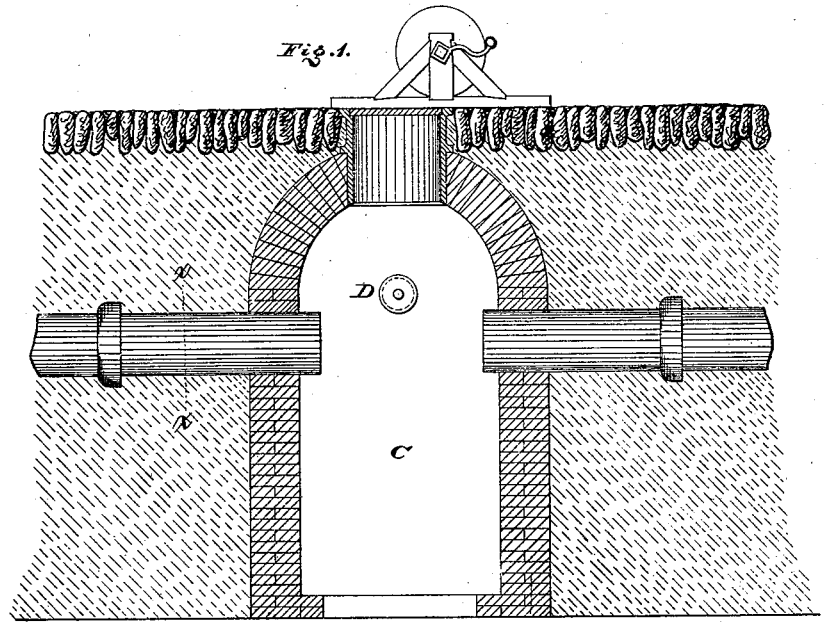
Figure 2:
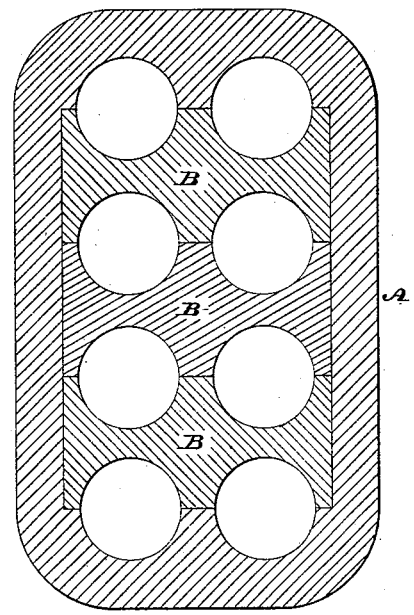
Figure 3:
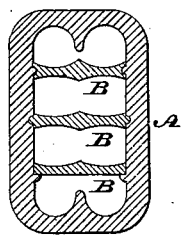

Figure 1 is a view showing the conductor embodying my invention in position. Fig. 2 is a section, enlarged, in line $x\ x$, Fig. 1. Fig. 3 is a section of a modification.

Similar letters of reference indicate corresponding parts in the several figures.

My invention consists of an underground electric conductor formed of lengths of tubing and detachable or separated trays fitted within the same, whereby when the tubing is laid the trays may be conveniently located and provide means for supporting, inclosing, and separating the electric wires or cables.

It also consists of testing-stations adapted for operating from above the ground the wires or cords which draw the electric wires or cables through the conductors.

Referring to the drawings, A represents a tube or tubing, formed of glazed terra-cotta, glass, or other suitable material, properly laid in the earth in the direction the electric wires or cables are to run.

B represents a series of trays, which are adapted to be placed one above the other, support each other in the tube A, and fill the space thereof. On the upper and lower faces of the trays, or one face of each, are horizontally-extending channels $a$, for the reception of the electric wires or cables.

The tubing is laid in lengths or sections properly connected, and the trays B are run thereinto at one end and pushed along the required extent, and the electric wires or cables are then introduced into and passed through the channels $a$, the latter thus acting to inclose, support, and separate the wires or cables. As the trays are formed separately from the tubing or shells A, the channels $a$, not liable to become distorted in the process of construction of the trays, will be found to be uniform and unobstructed.

In Fig. 3 I show a modification, where the trays are supported on ledges formed on the sides of the inner face of the tube.

The conductors lead into testing-stations C, located in the ground at proper distance apart, formed of a water-proof and suitably-closed vault, provided with one or more rollers, D, properly mounted within the same, over which the drawing-wires connected to the conductors may be run for the purpose of operating said wires outside of the stations, as shown in Fig. 1, said operation being conveniently accomplished without the necessity of the workman remaining in the station longer than is necessary to start the work.

Having thus described my invention, what I claim as new, and desire to secure by Letters Patent, is—

1. A series of detachable trays, B, each having one or more grooves on both its upper and its lower side, in combination with a tube which incases said trays and holds them together, so that each lower groove of one tray and the corresponding upper groove of the tray below it will form a passage for a line-wire, substantially as set forth.

2. The tube A, having semi-cylindrical interior grooves at both ends, in combination with detachable grooved trays B, substantially as set forth.

E. Z. COLLINGS.

Witnesses:
JOHN A. WIEDERSHEIM,
F. COOPER.